US012443140B1

(12) United States Patent
Gatt et al.

(10) Patent No.: US 12,443,140 B1
(45) Date of Patent: Oct. 14, 2025

(54) PHASE COMPENSATION METHOD FOR DIGITAL HOLOGRAPHY SYSTEMS

(71) Applicant: LOCKHEED MARTIN CORPORATION, Bethesda, MD (US)

(72) Inventors: Philip Gatt, Berthoud, CO (US); Christopher Michael Ryan, Erie, CO (US); Brian Krause, Erie, CO (US); Samuel Trent Thurman, Arvada, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 1023 days.

(21) Appl. No.: 17/458,024

(22) Filed: Aug. 26, 2021

(51) Int. Cl.
*G03H 1/04* (2006.01)
*G01B 9/02* (2022.01)
*G01B 9/02015* (2022.01)
*G03H 1/08* (2006.01)
*G06V 10/88* (2022.01)

(52) U.S. Cl.
CPC ....... *G03H 1/0443* (2013.01); *G01B 9/02032* (2013.01); *G01B 9/02047* (2013.01); *G03H 1/0866* (2013.01); *G06V 10/895* (2022.01); *G03H 2001/0445* (2013.01); *G03H 2001/0469* (2013.01); *G03H 2225/33* (2013.01)

(58) Field of Classification Search
CPC .. G03H 1/0443; G03H 1/0465; G03H 1/0866; G03H 2001/0445; G03H 2001/0452; G03H 2001/0469; G03H 2225/33; G01B 9/02032; G01B 9/02045; G01B 9/02047; G01S 7/4808; G01S 17/00–17/95; G06V 10/89; G06V 10/895
See application file for complete search history.

(56) References Cited

U.S. PATENT DOCUMENTS

| | | | |
|---|---|---|---|
| 9,176,226 B1* | 11/2015 | Sego | G01S 13/9029 |
| 9,581,967 B1* | 2/2017 | Krause | G03H 1/0443 |
| 2006/0262324 A1* | 11/2006 | Hays | G01P 5/26 |
| | | | 356/519 |
| 2014/0244196 A1* | 8/2014 | Uchida | G01B 9/02083 |
| | | | 702/94 |
| 2024/0053452 A1* | 2/2024 | Herzog | G01S 7/4917 |

\* cited by examiner

*Primary Examiner* — Michael P LaPage
(74) *Attorney, Agent, or Firm* — BAKERHOSTETLER

(57) ABSTRACT

Systems and methods are provided for a digital holography system. The subject system uses wide-bandwidth data, monitor beams, and signal beams to form a digital interference, yielding a reference phase and angle that can be used to compensate DH phase errors. DH systems disclosed herein can provide an ability to sense and correct for phase errors and/or instabilities to perform DH vibrometry. Such a system provides a compact and low-cost solution to improve sensing in, for example, systems that rely on phase stability for precision 3D and/or vibration imaging.

9 Claims, 8 Drawing Sheets

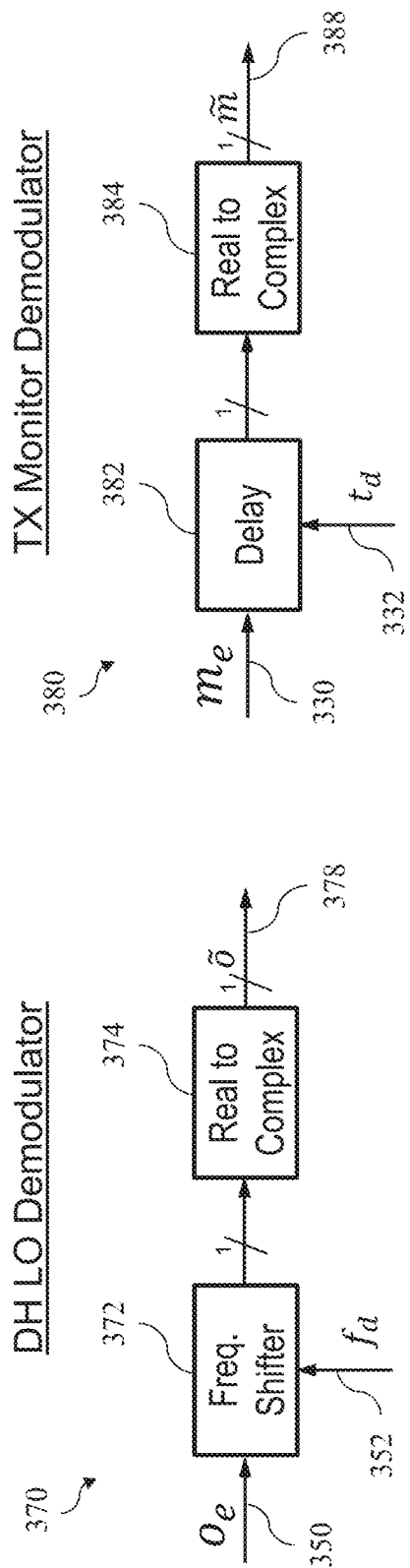

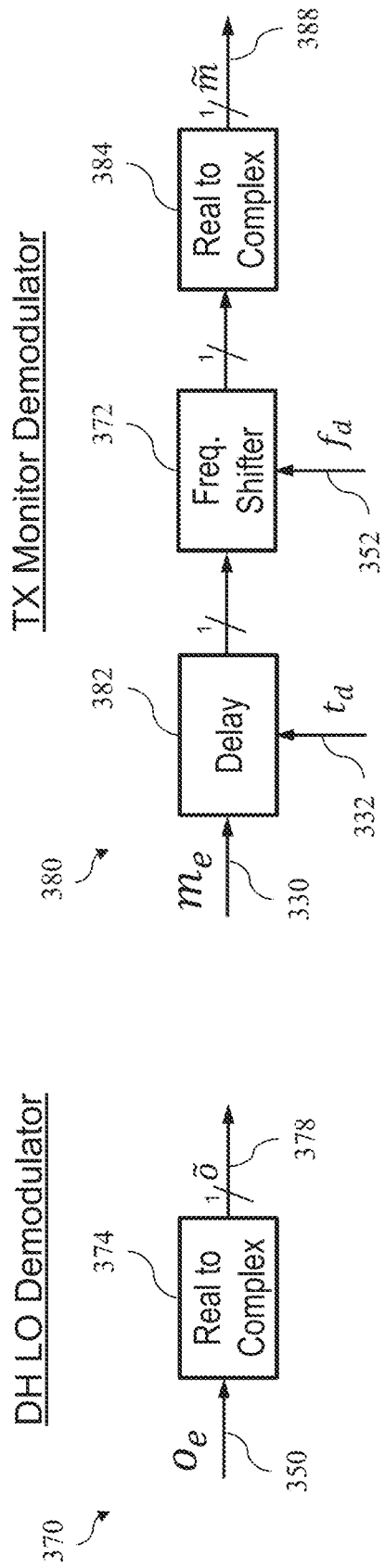

PHASE COMPENSATION METHOD FOR DIGITAL HOLOGRAPHY SYSTEMS

STATEMENT REGARDING FEDERALLY SPONSORED RESEARCH OR DEVELOPMENT

Not applicable.

FIELD

The present disclosure generally relates to coherent laser radar imaging systems, and more particularly, to Digital Holography (DH) imaging.

BACKGROUND

Light detection and ranging (lidar) and laser detection and ranging (ladar) systems, hereafter collectively referred to as ladar systems, are remote sensing systems that send light from a transmitter to a target, detect light scattered from the target using a receiver, and infer properties about the target from the detected light. Inferred properties may include 2D and 3D target image, range, velocity, vibration, material, and other parameters. Ladar systems use either direct detection or coherent detection schemes for detection of the scattered light.

Direct detection ladar systems do not incorporate a reference beam and only measure the reflected field's irradiance. In contrast, coherent detection systems include a receiver that incorporates a reference beam of light, often called a local oscillator (LO) or master oscillator (MO), that is interfered with the received light to produce a signal downshifted to the radio frequency (RF) band where it's amplitude and phase can be measured. In this sense, the detected signal is proportional to the interference irradiance between the signal and the reference electric fields. Typically, the LO field is constant and the resultant signal is proportional to the target reflected field rather than its reflected irradiance, which is what is measured when the LO field is not present. Thus, coherent receivers sense both the amplitude and phase of the target return field. Access to field phase enables many measurements and ladar architectures not available to direct detection lidar including Doppler-velocity, vibrometry, synthetic and multi-aperture ladar and wavefront sensing.

Many ladar systems that operate in the field—for example, from aircraft—are severely limited in the amount of space they can occupy and the electrical power they can draw from the aircraft. In addition, operation with the greatest possible sensitivity is essential. Furthermore, operational scenarios in current and future systems place a high premium on transmitter and/or receiver multi-functionality, such that it is highly desirable for a single installed system to be capable of carrying out multiple measurements with high efficiency. This is particularly the case where size, weight, power, and cost (SWPaC) are at a premium, as is the case in land-based vehicles, aircraft, aircraft pods, UAVs (unmanned aerial vehicles), MAVs (micro air vehicles), and satellite payloads. This trend to improved SWPaC is anticipated to continue with a desire to increase the multi-functionality of the measurement systems.

Digital holography (DH) is a form of coherent detection ladar, where the object or target is flood-illuminated with a laser signal and the reflected light (or the returned laser signal) from the target is detected by an array of detectors. In the image-plane recording geometry, these detectors are located in the optical system's image-plane. Other recording geometries are possible (e.g., pupil-plane, where the detectors are located in the pupil plane). The reflected light is interfered with one or more off-axis reference beams (e.g., local oscillators) to form holograms on the focal plane array. The recorded holograms have interference fringes with an orientation corresponding to the lateral geometry of the local oscillators relative to the receiver. Of particular interest is remote sensing applications where everyday objects (e.g., vehicles, buildings, and people) are observed at moderate to long standoff distances (e.g., from a few meters to many kilometers). These tactical DH systems require a-priori target range and velocity knowledge to enable good temporal and spectral overlap between the return signal and the reference (LO) beams.

BRIEF DESCRIPTION OF THE DRAWINGS

FIG. 5 illustrates a block diagram of an example of the DH LO demodulator of FIG. 4 in accordance with one or more implementations of the subject technology.

FIG. 6 illustrates a block diagram of an example of the TX monitor demodulator of FIG. 4 in accordance with one or more implementations of the subject technology.

FIG. 7 illustrates a block diagram of an example of the DH LO demodulator of FIG. 4 in accordance with one or more implementations of the subject technology.

FIG. 8 illustrates a block diagram of an example of the TX monitor demodulator of FIG. 4 in accordance with one or more implementations of the subject technology.

DETAILED DESCRIPTION

Figure 1:
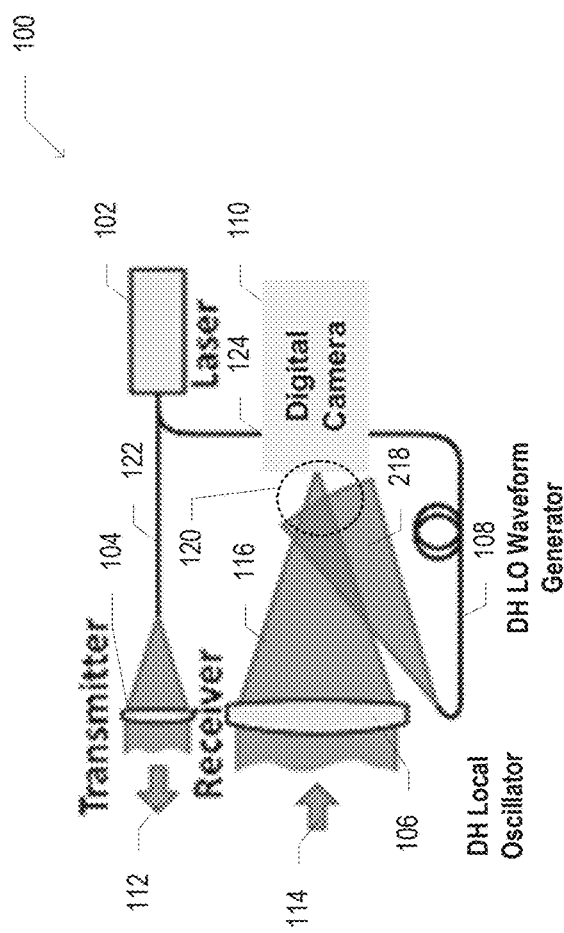
FIG. 1 conceptually illustrates a simplified diagram of a digital holography system using the image-plane recording geometry.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more implementations. In one or more instances, well-known structures and components are shown in block diagram form in order to avoid obscuring the concepts of the subject technology.

DH imaging laser radar sensors can only sense targets in a single range-Doppler (RD) bin. Consequently, DH laser radar sensors need to be paired with a range and velocity sensor to cue the DH receiver. Various approaches to solve the problem of estimating target range (waveform time delay) and velocity (waveform Doppler shift or frequency shift) can be envisioned. One approach includes augmenting the DH transceiver (transmitter+receiver) with an independent laser range finder system to estimate range and range-rate. Here, the independent laser range finger system measures target range with a time-of-flight laser system. Velocity (range-rate) is inferred by estimating the change in target range over several independent pulses. This is called range-rate estimation as opposed to direct Doppler sensing, where the frequency (color) of the light (or electromagnetic radiation) is directly measured using a coherent receiver.

In some systems, DH vibrometry requires a stationary reference target within the image to compensate for phase errors and/or instabilities on either the outgoing waveform or the DH reference waveform. With such systems, the DH receiver senses the relative motion of the scene with respect to the reference target.

In some embodiments of the subject technology, DH systems disclosed herein can provide an ability to sense and correct for phase errors and/or instabilities to perform DH vibrometry. Such systems can include one or more wide-bandwidth (hereafter called wideband) detectors and/or data acquisition systems to sense a downshifted to radio frequency copy of the outgoing DH waveform (e.g., "TX monitor" or "m") by interfering the TX monitor beam with a continuous wave ("CW") master oscillator beam ("MO") on a sufficiently wide bandwidth detector. One or more detectors can also sense the local oscillator waveform (e.g., "LO" or "o") by interfering the DH LO beam with a CW MO beam on a sufficiently wide bandwidth detector.

Standard, many-pixel DH receivers interfere the DH LO with the target return waveform (e.g., "signal" or "s"). Any phase error embedded in either the transmit or DH LO beams will be interpreted as target motion. In contrast, the subject technology includes a system that uses wide-bandwidth measurements, from which phase errors can be extracted and used to compensate phase errors in the DH transceiver. Such a system provides a compact and low-cost solution to improve sensing in, for example, imaging systems that rely on phase stability (e.g., precision 3D and/or vibration imaging).

FIG. 1 conceptually illustrates a simplified diagram of a digital holography system 100. The digital holography system 100 uses an image-plane recording geometry. The digital holography system 100 includes a coherent optical signal source 102 (depicted as "Laser"), an optical transmitter 104, an optical receiver 106, a DH local oscillator (DH LO) generator 108, and a detector 110 (depicted as "Digital Camera").

As depicted in FIG. 1, optical signal from the coherent optical signal source 102 is split between two beam paths, where a first beam path 122 is used for illuminating an object (not shown) and a second beam path 124 is used for forming a holographic reference. The holographic reference may correspond to a reference DH LO beam 118 produced by the DH LO generator 108. The optical signal carried on the first beam path 122 interacts with the optical transmitter 104 to form outgoing optical signal 112 that is directed to illuminate the object.

The optical receiver 106 collects a return signal 114 that is scattered by the object to form collected optical signal 116 and interferes the collected optical signal 116 with the reference DH LO beam 118 to form a hologram interference pattern 120. The hologram interference pattern 120 is then recorded by the detector array or camera 110z.

This detection process, which interferes an off-axis reference DH LO beam (e.g., 118) with the image (e.g., the collected optical signal 116 of the object), is known as spatial heterodyne and is part of a larger detection methodology called coherent detection. Coherent detection receivers provide access to image amplitude and phase as opposed to conventional imaging, which only records image intensity. Having access to image amplitude and phase enables many imaging modalities including 3D, synthetic aperture, vibration imaging, and others.

Although FIG. 1 shows one embodiment of a DH system, there are other DH geometries (e.g., pupil-plane recording geometry, temporal rather than spatial heterodyne, etc.) that may apply to provide coherent detection. The components that may be common among the different DH geometries include a transmit laser (e.g., 102), a local oscillator laser (e.g., 108) and a digital camera (e.g., 110).

Figure 2:
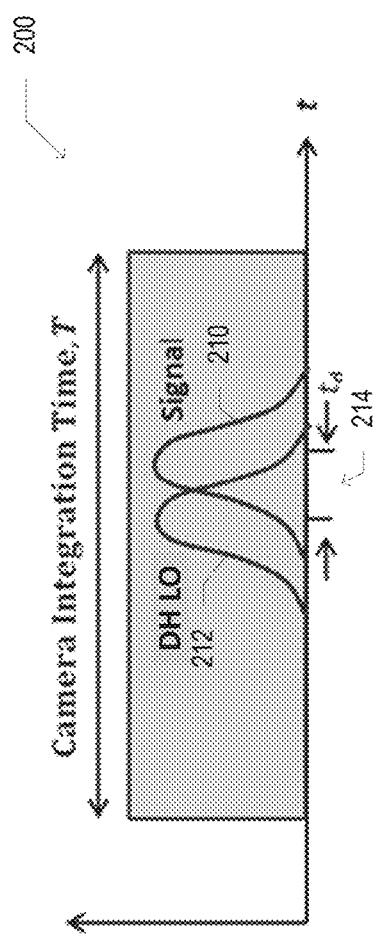
FIG. 2 conceptually illustrates an example of camera integration process of two waveforms separated by a time delay and potentially frequency shifts.

FIG. 2 conceptually illustrates a plot depicting an example of a camera integration process 200. The camera integration process 200 shows two waveforms (e.g., 210, 212) separated by a time delay 214. In many long-range ladar applications, the transmitted optical signal waveform is pulsed (hereinafter "the signal pulse 210"). In some implementations, the transmitted optical signal waveform corresponds to the outgoing optical signal 112 of FIG. 1. In this respect, the signal waveform 210 can correspond to a pulse of the outgoing optical signal 112. For these pulsed applications, the reference beam is also pulsed (hereinafter "the DH LO reference pulse 212"). In some implementations, the reference beam corresponds to the reference DH LO beam 118 of FIG. 1. In this respect, the DH LO reference pulse 212 can correspond to a pulse waveform of the reference DH LO beam 118. For maximal efficiency, the time-delay of the DH LO reference waveform 212 needs to be matched to the anticipated time-of-arrival of the returned signal waveform 210. Typical waveform lengths are in a range of 50 ns to 500 ns. The extent to which the returned signal waveform 210 and the DH LO reference waveform 212 overlap in time influences the overlap efficiency. If there is no overlap of the signal waveform 210 and the DH LO reference waveform 212, then the efficiency is zero. With near perfect overlap, the efficiency can approach unity. Likewise, the DH LO reference waveform 212 needs to be frequency tuned or shifted, with respect to the signal waveform 210, to match the anticipated Doppler shifted frequency imparted on the signal waveform 210 due to relative target motion. Consequently, the DH LO reference waveform 212 needs to be matched in shape, time and frequency to a received signal waveform (that corresponds to a waveform of the return signal 114) if reasonable mixing efficiency is to be achieved.

A transmit laser (e.g., the outgoing optical signal 112 of FIG. 1) does not necessarily need to be pulsed, which is a form of amplitude modulation (AM). The outgoing optical signal 112 can be a continuous wave (i.e., no modulation) in some implementations, or the outgoing optical signal 112 can be a phase modulated CW in other implementations. Regardless of the type of modulation used, the DH LO (e.g., the reference DH LO beam 118) can be identically modulated and time-frequency shifted to match the time delay 214 and Doppler frequency shift of the return signal 114.

The signal measured through this camera integration process is a single positive number for each spatial pixel. In spatial heterodyne detection this number represents a spatial sample of a constant offset plus a spatial sine wave with pixel dependent phase. This phase can be interpreted as target longitudinal position. This spatial phase is extracted by a spatial demodulation process (not described herein). A phase that changes over time can be interpreted as target motion. Time varying phase errors on either the transmit waveform or the DH LO waveform are therefore misinterpreted as target motion. The subject invention measures these phase errors with a separate wideband detector and uses those independent measurements to compensate the DH phase.

Figure 3:
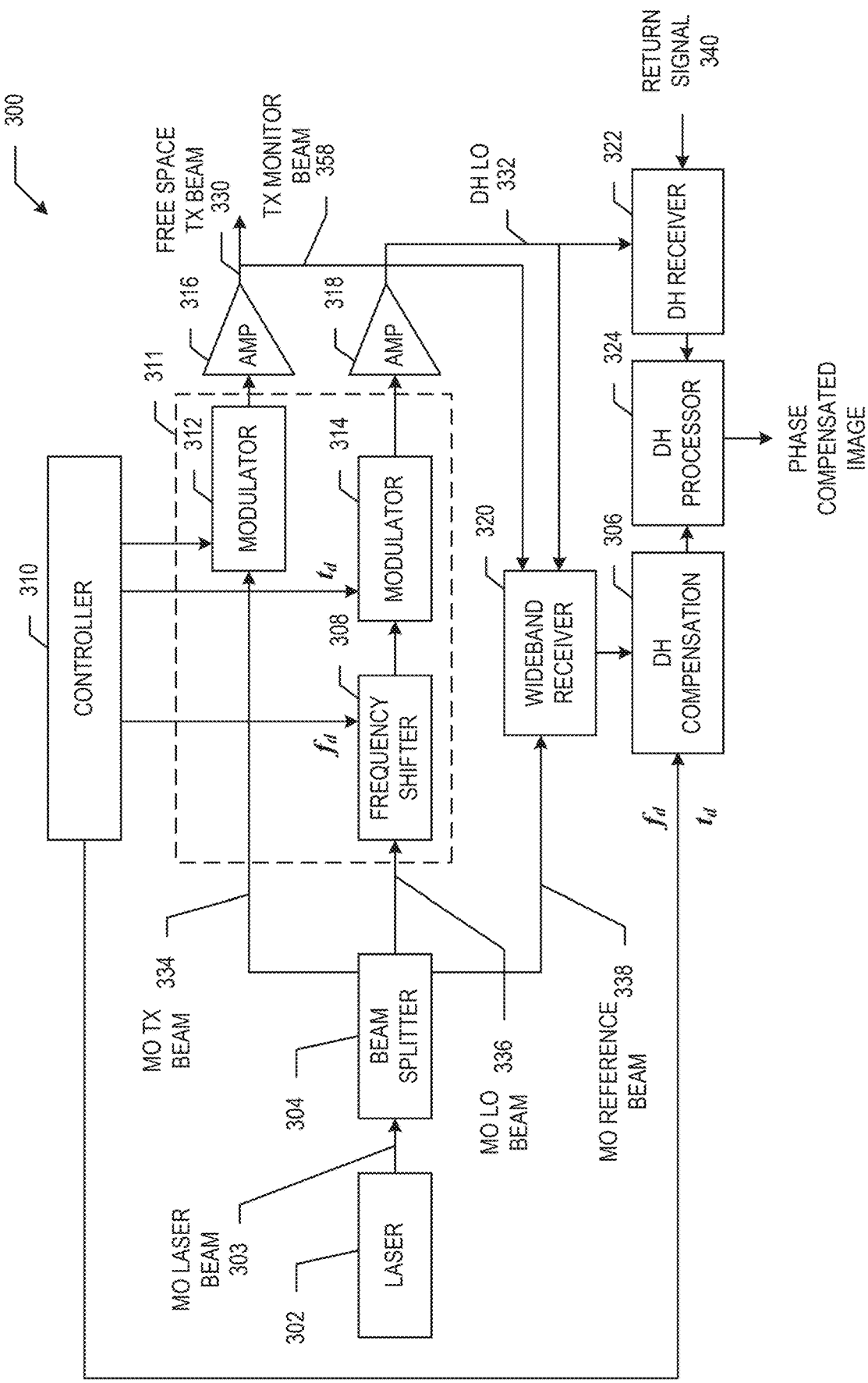
FIG. 3 illustrates a block diagram of an example of a digital holography transceiver system in accordance with one or more implementations of the subject technology.

Referring now to FIG. 3, a digital holography transceiver system can facilitate phase-based imaging (e.g., vibration imaging) by sensing and correcting for phase errors and/or instabilities. Such systems can include one or more wideband detectors and/or data acquisition systems to sense a radio frequency copy of the outgoing DH waveform (e.g., "TX monitor" or "m") as well as a local oscillator waveform (e.g., "LO" or "o") to perform compensation on the return signal. (e.g., "s").

FIG. 3 illustrates a block diagram of an example of a digital holography transceiver system 300 in accordance with one or more implementations of the subject technology. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The combined digital holography transceiver system 300 includes a laser source 302, a beam splitter 304, a waveform modulator 312 (e.g., including but not limited to a phase modulator, an amplitude modulator, a waveform shaper, etc.), and an amplifier 316 on a transmit path of the digital holography transceiver system 300. The digital holography transceiver system 300 also includes a frequency shifter 308, a waveform modulator 314 (e.g., including but not limited to a phase modulator, an amplitude modulator, a waveform shaper, etc.), and an amplifier 318 on a local oscillator path of the digital holography transceiver system 300. The digital holography transceiver system 300 also includes a DH receiver 322 and a DH processor 324 on a DH receive path of the digital holography transceiver system 300. The digital holography transceiver system 300 also includes a wideband receiver 320 and a controller 310 on a RD receive path of the digital holography transceiver system 300. In one or more implementations, the DH receiver 322 may include a high-speed digital camera. The DH processor 324 may include a computer system to receive and process images from the DH receiver 322.

In operation, the laser source 302 generates an optical signal, such as a CW master oscillator (MO) laser beam 303, from the laser source 302. In this example, the digital holography transceiver system 300 employs a single laser source 302, where the frequency of the optical signal of the laser source 302 is held constant. In other implementations, the frequency of the optical signal of the laser source 302 may vary over time (or non-constant over time). The constant frequency MO laser signal 303 (namely, the optical signal of the laser source 302) serves as a master reference signal for the coherent data combination.

As depicted in FIG. 3, part of optical signal of a continuous wave ("CW") master oscillator MO laser source 303 is divided (or split) by the beam splitter 304 such that a first optical signal, TX monitor beam 334, can serve as the free space transmit (TX) beam signal 330, a second optical signal can serve as a MO LO laser beam 336 for DH functions (e.g., 332), and a third optical signal can serve as a CW MO reference beam 338 for wide-bandwidth detection and later compensation functions.

The first optical signal of the laser source 302, namely the TX monitor beam 334, is transmitted to a target (not shown) through an optical processing subsystem 311, and may be amplified using an amplifier 316 before being transmitted. The target is flood-illuminated, and scattered electromagnetic radiation from the target is returned and received by imaging optics (e.g., 106) having one or more lenses. In some aspects, the optical processing subsystem 311 includes the frequency shifter 308 and waveform modulators 312 and 314.

In some implementations, the amplifier 316 may amplify the transmit waveform into a free space transmit beam signal 330 for transmission to a target. The modulated signal is shaped by the waveform modulator 312 and then amplified by a wideband amplifier, such as the amplifier 316, and directed out through the transmit optics (e.g., 104) to the target. In one or more implementations, each of the amplifiers 316 and 318 may include one or more amplifiers. In some aspects, the amplifiers 316 and 318 may be erbium-doped fiber amplifiers. In some aspects, the waveform modulators 312 and 314 may be configured to shape the respective optical signals into a square-shaped waveform having a duration of a few nano seconds to hundreds of milliseconds or even continuous wave.

In some implementations, the DH local oscillator signals (e.g., DH LO beam 332) may be mixed with an optical return signal (e.g., return signal 340) from the target in the digital holography receiver (622). In some implementations, the DH LO beam 332 may be directed through a first optical fiber toward the DH receiver 322.

In various aspects, the detector(s) in the DH receiver 322 may be implemented with simple p-i-n photo-detectors, avalanche photo-detectors (APDs), or Geiger-mode avalanche photo-detectors (GmAPDs). The APDs may include a material choice and/or purposely designed structures to exhibit ultra-low excess noise values under coherent detection operation.

In some aspects, one or more high-speed, high-dynamic range, frequency shifters may be part of the digital holography transceiver system 300 to match the color (or offset frequency) between the MO LO laser beam 336 and the return signal 340, in which detectors on the wideband receiver 320 are configured to detect electromagnetic radiation by coherent detection at the particular offset frequency. For example, the digital holography transceiver system 300 can include a frequency shifter 308 that applies a frequency shift or delay (e.g., "$f_s$") to the MO LO laser beam 336, based on operation of the controller 310. The frequency shift, $f_s$, corresponds to the target frequency Doppler-shift. The frequency shifter 308 may include one or more fiber-coupled acoustical optical modulators, which can be used to globally tune the frequency of the MO LO laser beam 336. The frequency shifter 308 may include one or more fiber-coupled frequency modulators, which can be used to globally tune the frequency of the MO LO laser beam 336 to match the color (or frequency) of the return signal 340. In some embodiments, frequency tuning of the TX monitor beam 334 need not be applied.

In some aspects, the waveform modulator 314 of the digital holography transceiver system 300 can be configured to shape the optical signals of the MO LO laser beam 336 (e.g., following the frequency shift) with a time shift. For example, the waveform modulator 314 can apply a time delay (e.g., "$t_d$") to the MO LO laser beam 336 (e.g., following the frequency shift), based on operation of the controller 310. The time delay, $t_d$, corresponds to the target round-trip delay time.

It will be understood that the optical train along the optical receive path can include a feedback loop for the real-time or post-processing compensation of the target range and target velocity errors that the receiver(s) introduce. For example, one or more receivers may generate receiver data that includes time and frequency offsets delay between the transmitted and received waveforms. In this respect, such receivers can provide receiver data to the controller 310, and the controller 310 uses the time and frequency offsets for the DH LO beam 332, such that the DH LO beam 332 can be aligned to the next signal waveform in both time and frequency domains. In some aspects, the controller 310 provides control signals to the frequency shifter 308 and to the waveform modulator 314. In some examples, the control signals provided by the controller 310 can include, or be generated based at least on, the time and frequency offsets (e.g., shifts or delays) from receiver data.

Following amplification by the amplifier 318, the DH LO beam 332 co-propagates with the return signal 340 to the hologram interference plane, which is the image plane in the image plane recording geometry. The return signal 340 is coupled to the DH processor 324 via the DH receiver 322 for data acquisition and processing purposes. In operation, the return signal 340 enters the DH receiver 322 and combines with the DH LO beam 332. The mixed beam (comprising the DH LO beam 332 and the return signal 340) is detected by the DH receiver 322 and the image data is transferred to the DH processor 324. The return signal 340 may be the return electromagnetic radiation scattered from a target illuminated by the transmitted free space TX beam signal 330 that originated on the transmit path of the digital holography transceiver system 300. Electromagnetic radiation generated by the laser source 302 is generally transmitted to the target over an angular extent. Electromagnetic radiation scattered from the target returns along the same general path, is captured by imaging optics, and can propagate to an image plane such that an image of the target is formed at the image plane of the DH receiver 322.

In some implementations, the return signal 340 is compensated for phase errors on either the outgoing transmit beam 330 or the DH LO beam 332. The digital holography transceiver system 300 can be provided with mechanisms for fixing the phases on every return signal 340. Such compensation can be based on processing of wideband data from both the TX monitor beam 334 and DH LO beams 332.

For example, a wideband receiver 320 can receive and process the interference between the CW MO reference beam 338 and both the TX monitor beam 331, and the DH LO beam 332. The CW MO reference beam 338 can correspond to the optical beam from the beam splitter 304. The TX monitor beam 331 can correspond to (e.g., be split from) the free space transmit beam signal 330 that is transmitted to a target after amplification by the amplifier 316. The DH LO beam 332 directed to the wideband receiver 320 can correspond to (e.g., be split from) another portion thereof that is directed to the DH receiver 322 for mixing with the return signal 340, as described herein. Each of the foregoing beams can be directed, for example, by optical fibers toward the wideband receiver 320, with splitters as needed to split beams between separate targets. While not all splitters that can be implemented are illustrated in FIG. 3, it will be understood that such can be provided as appropriate to direct the beams as described herein.

The CW MO reference beam 338, the TX monitor beam 331, and the DH LO beam 332 can be directed to one or more detectors of the wideband receiver 320. Two or more of the beams can be mixed to form a mixed beam that is input to one or more coherent photodetectors of the wideband receiver 320, as described further herein.

The digital holography transceiver system 300 can further include a DH compensation subsystem 306 for the real-time or post-processing compensation for phase errors and/or instabilities on either the outgoing waveform or the DH reference waveform. The DH compensation subsystem 306 may receive from the controller 310 data that includes time delays and frequency shifts applied to the MO LO laser beam 336, for example by the frequency shifter 308 and the waveform modulator 314. Data corresponding to such delays or shifts can be applied to the electrical signals output by the wideband receiver 320 to demodulate the signals and/or perform phase compensation, as described further herein.

Phase compensation information can optionally be applied by the DH processor 324 to generate a compensated signal. Additionally or alternatively, phase compensation can be performed by another processor separate from the DH processor 324. The compensation phasor can be applied to the output of the DH receiver 322, resulting from the combination of the return signal 340 and the DH LO beam 332.

Figure 4:
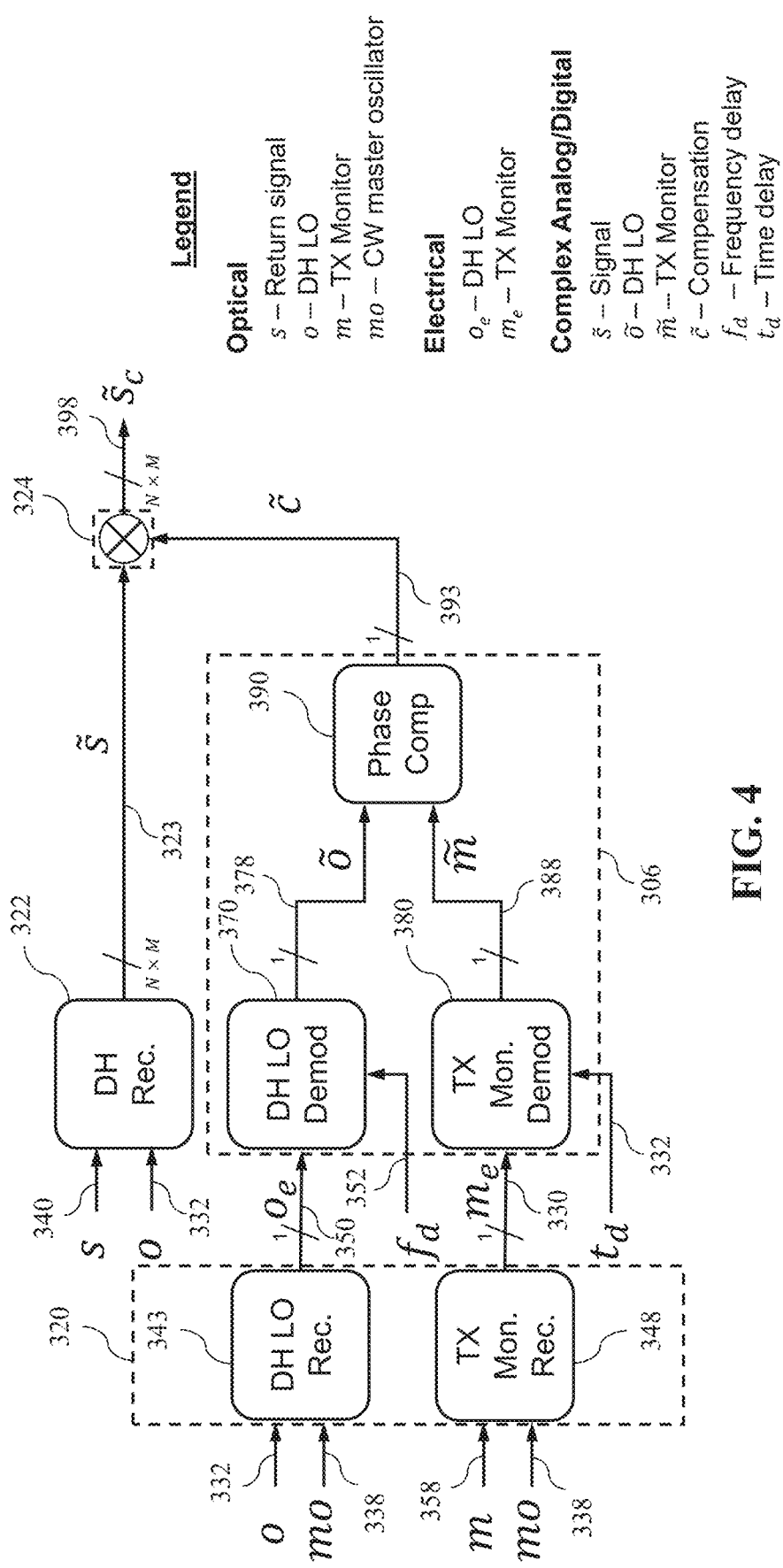
FIG. 4 illustrates a block diagram of portions of the digital holography transceiver system of FIG. 3 in accordance with one or more implementations of the subject technology.

Referring now to FIG. 4, compensation information can be determined and applied based on processing and analysis of various beams, including a continuous wave ("CW") master oscillator ("MO") reference beam 338.

As shown in FIG. 3, DH receiver 322 can combine and/or interfere the DH LO beam 332 (e.g., "o") with the target return signal 340 (e.g., "signal" or "s"). It will be understood that these beams can be received as optical beams that are detected, combined and/or otherwise processed to produce a complex return signal 323 (e.g., "$\tilde{s}$"). The complex return signal 323 can be, for example, an image with N×M pixels or channels.

Instead of interpreting any phase error embedded in either the transmit beam as sampled by the TX monitor beam 331 (e.g., "m") or the DH LO beam 332 (e.g., "o") as target motion based on the complex return signal 323, the system can use wideband data from the TX monitor beams and DH LO beams to form a digital interference. This provides a reference phase angle that can be used to compensate phase errors on the incoming complex return signal 323 (e.g., "$\tilde{s}$").

For example, the wideband receiver 320 can include or be accompanied by multiple receivers, such as a DH LO receiver 346 and/or a TX monitor receiver 348. In some embodiments, the wideband receiver 320 can be integrated with all components to operate as a single receiver that performs the functions described herein.

The DH LO receiver 346 and/or the TX monitor receiver 348 can be or include, for example, a balanced receiver. Corresponding input beams can be fed into a wideband optical mixer, and the heterodyne detected intermediate frequency (IF) output is fed to the balanced receiver of the corresponding receiver (e.g., DH LO receiver 346 and/or the TX monitor receiver 348). Balanced receivers can include a pair of serial photodiodes, which are widely used in coherent receivers owing to their capacity to suppress laser relative intensity noise (RIN) and the amplified spontaneous emission noise (ASE) from fiber amplifiers, such as erbium-doped fiber amplifiers.

As further shown in FIG. 4, the wideband DH LO receiver 346 can receive each of the DH LO beam 332 (e.g., "o") and the CW MO reference beam 338 (e.g., "mo"). It will be understood that these beams can be received as optical beams that are detected, combined and/or otherwise processed to produce a single DH LO electrical signal 350 (e.g., "$o_e$"). Similarly, the TX monitor receiver 348 can receive each of the TX monitor beam 331 (e.g., "m") and the CW MO reference beam 338 (e.g., "mo"). It will be understood that these beams can be received as optical beams that are detected, combined and/or otherwise processed to produce a single monitor electrical signal 360 (e.g., "$m_e$").

In both the DH LO receiver 346 and the TX monitor receiver 348, the CW MO reference beam 338 interferes with the TX monitor and DH LO beams to downshift the optical information into the radio frequency band. By including the stationary CW MO reference beam 338, such information is unaltered by any frequency shifts or time delays applied by the controller and the optical processing subsystem. Accordingly, each of the DH LO beam 332 and the TX monitor beam 331 can be combined with the CW MO reference beam 338 such that the resulting electrical signals contain the optical information of the TX monitor and the DH LO beams.

As further shown in FIG. 4, the DH compensation subsystem 306 can include an DH LO demodulator 370, a monitor demodulator 380, and a phase compensation subsystem 390. The DH compensation subsystem 306 can shift or delay the electrical (e.g., radio frequency or "RF") signals from the wideband receiver 320 based on the frequency and time delays that are applied to the MO LO laser beam 336. The DH compensation subsystem 306 can further demodulate the real-valued RF signals to extract amplitude and phase information.

The DH LO demodulator 370 can convert the DH LO electrical signal 350 to a single complex (e.g., analog or digital) DH LO signal 378 (e.g., "$\tilde{o}$"). Optionally, the DH LO demodulator 370 can receive, from the controller, a frequency shift signal 352 with data that includes a frequency shift applied to the DH LO laser beam, for example by the frequency shifter, as described further herein.

The monitor demodulator 380 can convert the monitor electrical signal 360 to a single complex (e.g., analog or digital) monitor signal 388 (e.g., "$\tilde{m}$"). The monitor demodulator 380 can receive, from the controller, a time delay signal 362 with data that includes a time delay applied to the monitor laser beam, for example by the modulator, as described further herein. Optionally, the monitor demodulator 380, rather than the DH LO demodulator 370 can receive, from the controller, the data that includes the frequency shift applied to the DH LO laser beam, as described further herein.

The phase compensation subsystem 390 can receive the DH LO signal 378 and the monitor signal 388 and combine them to produce a compensation signal 396 (e.g., "c") containing data corresponding to a compensation phasor. The DH processor 324 can apply the compensation phasor of the compensation signal 396 to the incoming complex return signal 323 received from the DH receiver 322. Thereby, the DH processor 324 can produce a compensated signal 398 (e.g., "$\tilde{S}c$"). The compensated signal 398 can be, for example, a complex valued image with N×M pixels.

Referring now to FIGS. 5-8, the DH LO demodulator and the monitor demodulator can process frequency and time delay information in one of a variety of ways to provide complex signals that are useful for compensation processing.

In some embodiments, as shown in FIGS. 5 and 6, the DH LO demodulator 370 can apply a frequency shift, and the monitor demodulator 380 can apply a time delay. For example, as shown in FIG. 5, the DH LO demodulator 370 can include a frequency shifter 372 that applies a frequency shift to the DH LO electrical signal 350 based on the frequency shift signal 352. The frequency shifter 372 can have one or more features of any other frequency shifter described herein. For example, the frequency shifter 372 can have the same or similar arrangement as the frequency shifter of the optical processing subsystem (see FIG. 3) and apply the same or similar frequency shift based on one or more signals from the controller. The DH LO demodulator 370 can further include an DH LO converter 374 that converts the incoming real-valued signal from the frequency shifter 372 to a complex-valued signal, provided as the DH LO signal 378.

By further example, as shown in FIG. 6, the monitor demodulator 380 can include a time delay module 382 that applies a time delay to the monitor electrical signal 360 based on the time delay signal 362. The time delay module 382 can have one or more features of any other time delay component described herein. For example, the time delay module 382 can have the same or similar arrangement as the modulators of the optical processing subsystem (see FIG. 3) and apply the same or similar time delay based on one or more signals from the controller. The monitor demodulator 380 can further include a monitor converter 384 that converts the incoming real-valued signal from the time delay module 382 to a complex-valued signal, provided as the monitor signal 388.

It will be understood that the frequency shifts and time delays can be applied in different ways. In some embodiments, as shown in FIGS. 7 and 8, the monitor demodulator 380 can apply both the frequency shift and the time delay. For example, as shown in FIG. 7, the DH LO demodulator 370 can omit the frequency shifter while still providing the DH LO converter 374 that converts the incoming real-valued DH LO electrical signal 350 to a complex-valued signal, provided as the DH LO signal 378.

By further example, as shown in FIG. 8, the monitor demodulator 380 can include the time delay module 382, as described with respect to FIG. 6. The monitor demodulator 380 can further include the frequency shifter 372, which can apply the frequency shift (e.g., to the time-delayed DH LO electrical signal 350) based on the frequency shift signal 352. Following the application of both frequency and time delays, the monitor converter 384 can convert the incoming real-valued signal to a complex-valued signal, provided as the monitor signal 388.

Accordingly, it will be understood that the frequency shift can be applied by either the DH LO demodulator 370 or the monitor demodulator 380 to create the same or similar relative phase relationship between the DH LO signal 378 and the monitor signal 388.

Figure 9:
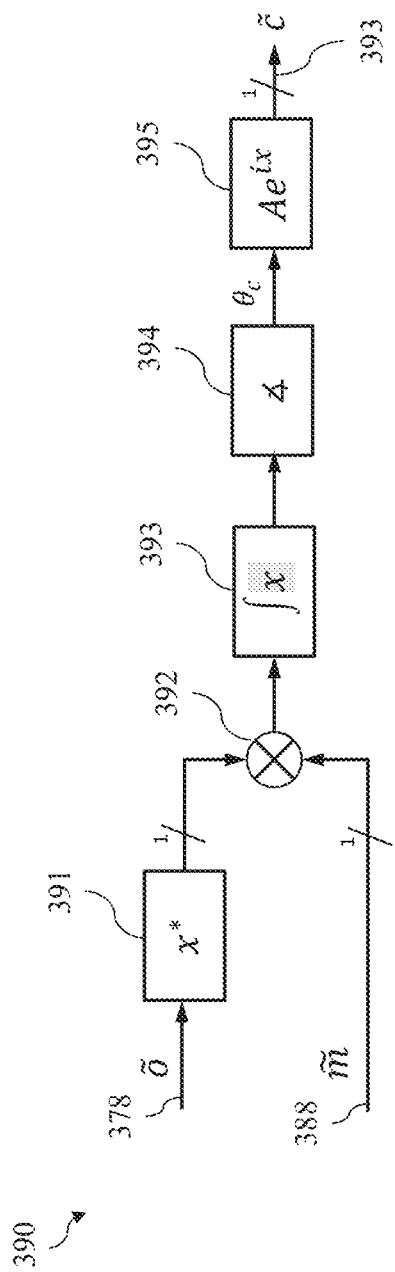
FIG. 9 illustrates a block diagram of an example of the phase compensation subsystem of FIG. 4 in accordance with one or more implementations of the subject technology.

Referring now to FIG. 9, the phase compensation subsystem 390 can receive the DH LO signal 378 and the monitor signal 388 and combine them to produce a compensation signal 396 containing data corresponding to a compensation phasor. The phase compensation subsystem 390 can optionally be implemented as a digital system with operator and/or modules to perform various operations.

At operation 391, the complex conjugate of the DH LO signal 378 is calculated. As such, the length and an angle (in polar coordinates) and/or the real and imaginary parts (in Cartesian coordinates) can be determined. Because the result has equal magnitudes and opposite sign, this operation can be viewed as taking the negative phase of the DH LO signal 378.

At operation 392, the result of operation 391 on the DH LO signal 378 and the monitor signal 388 are combined, for example with a multiplier operation. By multiplying the complex conjugate of the DH LO signal 378 by the monitor signal 388, the phase difference (e.g., compensation phasor) can be determined.

At operation 393, the compensation phasor resulting from the multiplier operation can be integrated over the waveform to calculate an amplitude-weighted average phase across multiple waveforms.

At operation 394, the angle (e.g., "$\Theta_c$") of the compensation phasor can be measured or estimated. For example, an arctangent operation can be applied to the incoming signal to calculate the angle.

At operation 395, the compensation phasor can be determined based on the calculated phase difference of the complex monitor and DH LO electrical waveforms. The complex compensation phasor can be represented by $$\tilde{C} = A_c e^{i\Theta_c} = A_c e^{i(\Theta_m - \Theta_0)}, \quad (2)$$

where $A_c$ and $\Theta_c$ are the compensation phasor amplitude and phase, Om represents the phase of the monitor signal 388, $\Theta_o$ represents the phase of the DH LO signal 378 and $i=\sqrt{-1}$ is the unit imaginary number. Accordingly, the phasor of the monitor signal 388 can be represented by $$\tilde{m} = A_m e^{i\Theta_m}, \quad (3)$$

where $\Theta_m$ is the phase of the monitor signal 388. The phasor of the of the DH LO signal 378 can be represented by $$\tilde{o} = A_o e^{i\Theta_o}, \quad (4)$$

where $\Theta_o$ is the phase of the DH LO signal 378. Because the complex conjugate (691) is applied to the DH LO signal 378, its phase will be the negative of the phase of the DH LO signal 378. The product of these phasors (as performed in operation 391), can be represented by $$\tilde{m}\tilde{o}^* = A_m A_o e^{i(\Theta_m - \Theta_o)}. \quad (5)$$

Therefore, the compensation angle, $\Theta_c$, can be extracted from the angle of this product.

Finally, it will be understood that the amplitude of the compensation vector, $A_c$, can be any number as long as it remains constant across waveforms. For example, the amplitude can be selected to modify the amplitude of a signal to which the compensation phasor is applied. Accordingly, the compensation phasor provides a multiplier that removes the phase errors when applied to the N×M channels of the signal. In particular, as described herein, the DH processor can apply the compensation phasor of the compensation signal to the incoming electrical return signal received from the DH receiver. Thereby, the DH processor can produce the compensated signal containing, for example, an image with N×M pixels.

Figure 10:
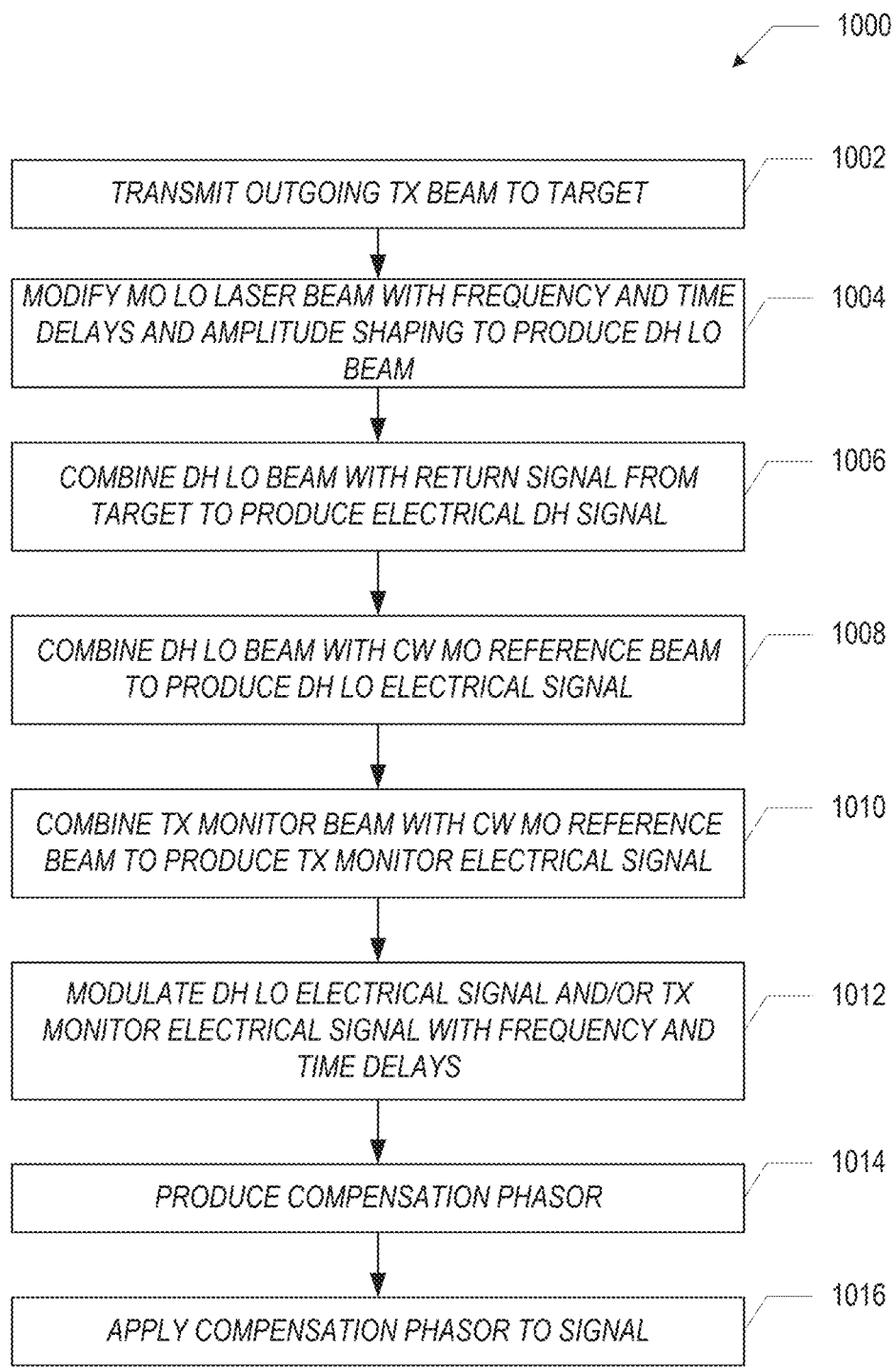
FIG. 10 illustrates a block diagram of a process for measuring and correcting phase errors in a digital holography transceiver according to one or more implementations of the subject technology.

FIG. 10 illustrates a block diagram of a process 1000 for a digital holography vibrometry system according to one or more implementations of the subject technology. For explanatory purposes, the process 800 is primarily described herein with reference to the digital holography transceiver system 300 of FIG. 3. However, the process 1000 is not limited to the digital holography transceiver system 300, and one or more blocks (or operations) of the process 1000 may be performed by one or more other components or circuits.

Further for explanatory purposes, the blocks of the process 1000 are described herein as occurring in serial, or linearly. However, multiple blocks of the process 1000 may occur in parallel. In addition, the blocks of the process 1000 need not be performed in the order shown and/or one or more blocks of the process 1000 need not be performed and/or can be replaced by other operations.

In operation 1002, an outgoing TX beam is transmitted to a target. In operation 1004, an DH LO laser beam is modified with frequency and time delays to produce an DH LO beam. In operation 1006, the DH LO beam is combined with a return signal from the target to produce a signal. In operation 1008, the DH LO beam is combined with an CW MO reference beam to produce a DH LO electrical signal. In operation 1010, a TX monitor beam is combined with the CW MO reference beam to produce a monitor electrical signal. In operation 1012, the DH LO electrical signal and/or the monitor electrical signal is modulated with frequency and time delays. In operation 1014, a compensation phasor is produced based on the modulated DH LO electrical signal and the modulated monitor electrical signal. In operation 1016, the compensation phasor is applied to the signal to produce a compensated signal.

The process 1000 may further include steps for interfering a portion of the return signal with the second reference DH LO beam signal to form a mixed beam, generating receiver data that includes the time and frequency shifts from the mixed beam, and providing the receiver data as feedback for controlling the first reference DH LO beam signal and the second reference DH LO beam signal.

Figure 11:
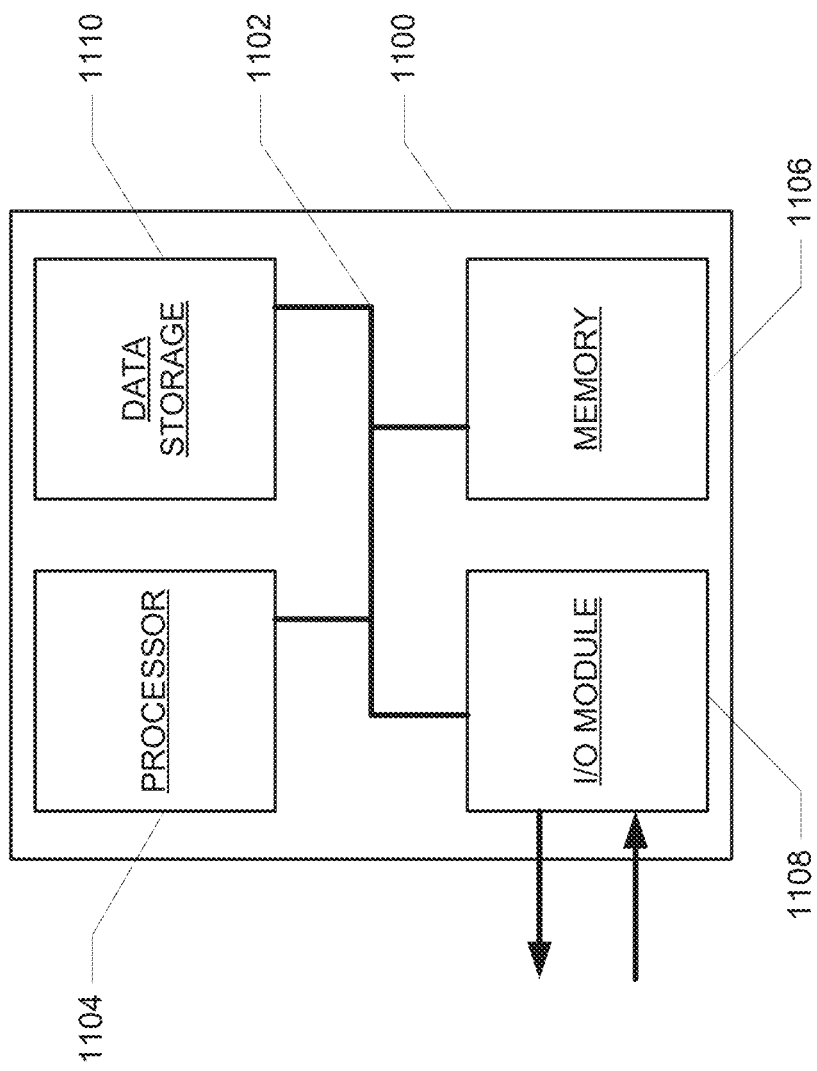
FIG. 11 is a block diagram that illustrates a computer system upon which an embodiment of the subject disclosure may be implemented.

FIG. 11 is a block diagram that illustrates a computer system 1100 upon which an embodiment of the subject disclosure may be implemented. Computer system 1100 includes a bus 1102 or other communication mechanism for communicating information, and a processor 1104 coupled with bus 1102 for processing information. Computer system 1100 also includes a memory 1106, such as a random access memory ("RAM") or other dynamic storage device, coupled to bus 1102 for storing information and instructions to be executed by processor 1104. Memory 1106 may also be used for storing temporary variables or other intermediate information during execution of instructions by processor 1104. Computer system 1100 further includes a data storage device 1110 coupled to bus 1102 for storing information and instructions.

Computer system 1100 may be coupled via I/O module 1108 to a display device (not illustrated), such as a liquid crystal display ("LCD"), a light-emitting diode ("LED") display, or a combination thereof, for displaying information to a computer user. An input device, such as, for example, a keyboard or a mouse may also be coupled to computer system 1100 via I/O module 1108 for communicating information and command selections to processor 1104.

According to one implementation of the subject disclosure, generating and configuring a plurality of beams with an antenna system may be performed by a computer system 1100 in response to processor 1104 executing one or more sequences of one or more instructions contained in memory 1106. Such instructions may be read into memory 1106 from another machine-readable medium, such as data storage device 1110. Execution of the sequences of instructions contained in main memory 1106 causes processor 1104 to perform the process steps described herein. One or more processors in a multi-processing arrangement may also be employed to execute the sequences of instructions contained in memory 1106. In alternative implementations, hard-wired circuitry may be used in place of or in combination with software instructions to implement various implementations of the subject disclosure. Thus, implementations of the subject disclosure are not limited to any specific combination of hardware circuitry and software.

The term "machine-readable medium" as used herein refers to any medium that participates in providing instructions to processor 1104 for execution. Such a medium may take many forms, including, but not limited to, non-volatile media, volatile media, and transmission media. Non-volatile media include, for example, optical or magnetic disks, such as data storage device 1110. Volatile media include dynamic memory, such as memory 1106. Transmission media include coaxial cables, copper wire, and fiber optics, including the wires that comprise bus 1102. Transmission media can also take the form of acoustic or light waves, such as those generated during radio frequency and infrared data communications.

The description of the subject technology is provided to enable any person skilled in the art to practice the various embodiments described herein. While the subject technology has been particularly described with reference to the various figures and embodiments, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these embodiments may be readily apparent to those skilled in the art, and generic principles defined herein may be applied to other embodiments. Thus, many changes and modifications may be made to the subject technology, by one having ordinary skill in the art, without departing from the scope of the subject technology.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various embodiments described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

What is claimed is:

1. A digital holography system comprising:
   a laser source configured to produce:
      a continuous wave master oscillator (MO) reference beam;
      a MO transmit (TX) beam;
      a MO local (LO) beam;
      a TX beam for transmission to a target;
      a TX monitor beam for sampling the TX beam; and
      a digital holography (DH) LO laser beam for interfering with a TX return signal beam from the target;
   an optical processing subsystem configured to apply a frequency shift and a time delay to the MO RX laser beam to produce a DH LO beam;
   a DH receiver for combining a return signal beam from the target with the DH LO beam to produce a complex return signal;
   a wide-bandwidth receiver configured to:
      combine the DH LO beam with a continuous wave (CW) MO reference beam to produce a DH LO electrical signal; and
      combine the TX monitor beam with the CW MO reference beam to produce a TX monitor electrical signal;
   a DH compensation subsystem configured to:
      modulate at least one of the DH LO electrical signal or the TX monitor electrical signal based on the frequency shift and the time delay to produce a complex DH LO signal and a complex TX monitor signal; and
      producing a compensation phasor based on the complex DH LO signal and the complex TX monitor signal; and
   a DH processor configured to apply the compensation phasor to the complex return signal to produce a compensated signal.

2. The digital holography system of claim 1, wherein the DH processor is further configured to produce an image of the target using the compensated signal.

3. The digital holography system of claim 1, wherein the optical processing subsystem comprises:
   a frequency shifter configured to apply the frequency shift to the MO LO laser beam; and
   a waveform modulator configured to apply the time delay to the MO LO laser beam.

4. The digital holography system of claim 3, wherein the optical processing subsystem further comprises an additional waveform modulator configured to shape the MO TX beam.

5. The digital holography system of claim 1, wherein the wide-bandwidth receiver comprises:
   an DH LO receiver configured to receive the DH LO beam and the CW MO reference beam; and
   a monitor receiver configured to receive the TX monitor beam and the CW MO reference beam.

6. The digital holography system of claim 1, wherein the DH compensation subsystem comprises:
   an DH LO demodulator configured to convert the DH LO electrical signal to the complex DH LO signal; and
   a monitor demodulator configured to convert the TX monitor electrical signal to the complex TX monitor signal.

7. The digital holography system of claim 6, wherein:
   the DH LO demodulator comprises a frequency shifter configured to apply the frequency shift to the DH LO electrical signal; and
   the monitor demodulator comprises a time delay module configured to apply the time delay to the TX monitor electrical signal.

8. The digital holography system of claim 6, wherein the monitor demodulator comprises:
   a time delay module configured to apply the time delay to the monitor electrical signal; and
   a frequency shifter configured to apply the frequency shift to the monitor electrical signal.

9. The digital holography system of claim 1, wherein the DH compensation subsystem further comprises a phase compensation subsystem configured to produce the compensation phasor based on a phase difference between the complex DH LO signal and the complex TX monitor signal.

* * * * *